US012435775B2

(12) United States Patent
Sessions et al.

(10) Patent No.: US 12,435,775 B2
(45) Date of Patent: Oct. 7, 2025

(54) SELF-REELING BELT DRIVE

(71) Applicant: Liftwave, Inc., Somerville, MA (US)

(72) Inventors: Blake Sessions, Boston, MA (US); Toomas Sepp, Somerville, MA (US)

(73) Assignee: Liftwave, Inc., Somerville, MA (US)

( * ) Notice: Subject to any disclaimer, the term of this patent is extended or adjusted under 35 U.S.C. 154(b) by 210 days.

(21) Appl. No.: 18/224,715

(22) Filed: Jul. 21, 2023

(65) Prior Publication Data

US 2023/0366453 A1 Nov. 16, 2023

Related U.S. Application Data

(63) Continuation of application No. 17/335,269, filed on Jun. 1, 2021, now Pat. No. 11,746,860.

(60) Provisional application No. 63/129,695, filed on Dec. 23, 2020.

(51) Int. Cl.
*F03G 3/00* (2006.01)
*F16H 19/02* (2006.01)
*F16H 19/06* (2006.01)
*F16H 33/20* (2006.01)

(52) U.S. Cl.
CPC .......... *F16H 19/02* (2013.01); *F16H 19/0618* (2013.01)

(58) Field of Classification Search
CPC ... B66D 1/02; B66D 1/04; B66D 1/06; B66D 1/14; B66D 1/16; B66D 1/28; B66D 1/36; B66D 1/54; B66D 1/60; B66D 1/74; B66D 1/7473; B66D 1/7484; F16H 19/0618; F16H 19/02; F16H 19/0654

USPC ........................................................... 74/89.22
See application file for complete search history.

(56) References Cited

U.S. PATENT DOCUMENTS

| | | | | |
|---|---|---|---|---|
| 2,878,684 | A * | 3/1959 | Kerfoot | B41J 11/24 74/125.5 |
| 4,957,014 | A | 9/1990 | Burke | |
| 5,860,333 | A | 1/1999 | Feng | |
| 6,883,784 | B1 * | 4/2005 | Sloneker | B66D 1/04 254/366 |
| 2004/0140384 | A1 | 7/2004 | Goodley | |
| 2009/0205933 | A1 | 8/2009 | Sugahara | |

(Continued)

FOREIGN PATENT DOCUMENTS

| | | |
|---|---|---|
| CN | 1835811 | 9/2006 |
| CN | 106744080 | 5/2017 |

(Continued)

OTHER PUBLICATIONS

Office Action in Japanese Appln. No. 2023-538782, mailed on Jul. 29, 2025, 4 pages (with English translation).

(Continued)

*Primary Examiner* — T. Scott Fix
(74) *Attorney, Agent, or Firm* — Fish & Richardson P.C.

(57) ABSTRACT

The present disclosure involves a belt drive mechanism which can be used to pay out or draw belt to or from a belt actuated system (or belt driven system). The mechanism features a self-winding spool which can automatically wind or unwind portions of the belt as they are withdrawn from, or fed to the belt actuated system. A second rotational axle (idler shaft), with one or more sheaves (e.g., pulley's or rollers) can be rotationally coupled to a capstan via a belt, and can be utilized to drive additional mechanisms in the belt drive mechanism, such as a winding mechanism.

20 Claims, 7 Drawing Sheets

(56) References Cited

U.S. PATENT DOCUMENTS

| | | |
|---|---|---|
| 2009/0249903 A1 | 10/2009 | Godler |
| 2011/0056321 A1 | 3/2011 | Sim et al. |
| 2012/0306216 A1 | 12/2012 | Nwabuzor |
| 2015/0275847 A1 | 10/2015 | Sung et al. |
| 2017/0211668 A1 | 7/2017 | Hsieh |
| 2017/0248208 A1 | 8/2017 | Tamura |
| 2018/0045284 A1 | 2/2018 | Rosengren et al. |
| 2019/0113055 A1 | 4/2019 | Fange-Larsen |
| 2020/0256436 A1 | 8/2020 | Sessions |
| 2022/0143923 A1 | 5/2022 | Collins et al. |
| 2022/0194735 A1 | 6/2022 | Sessions et al. |

FOREIGN PATENT DOCUMENTS

| | | | | |
|---|---|---|---|---|
| CN | 111017768 A | * | 4/2020 | ............... B66D 1/24 |
| EP | 0534008 | | 3/1993 | |
| JP | H02-255431 A | | 10/1990 | |
| WO | WO 2006008515 | | 1/2006 | |
| WO | WO 2019051407 | | 3/2019 | |
| WO | WO-2019051407 A1 | * | 3/2019 | ............. F16H 55/00 |

OTHER PUBLICATIONS

International Search Report and Written Opinion in International Appln. No. PCT/US2021/064594, dated Mar. 14, 2022, 15 pages.

\* cited by examiner

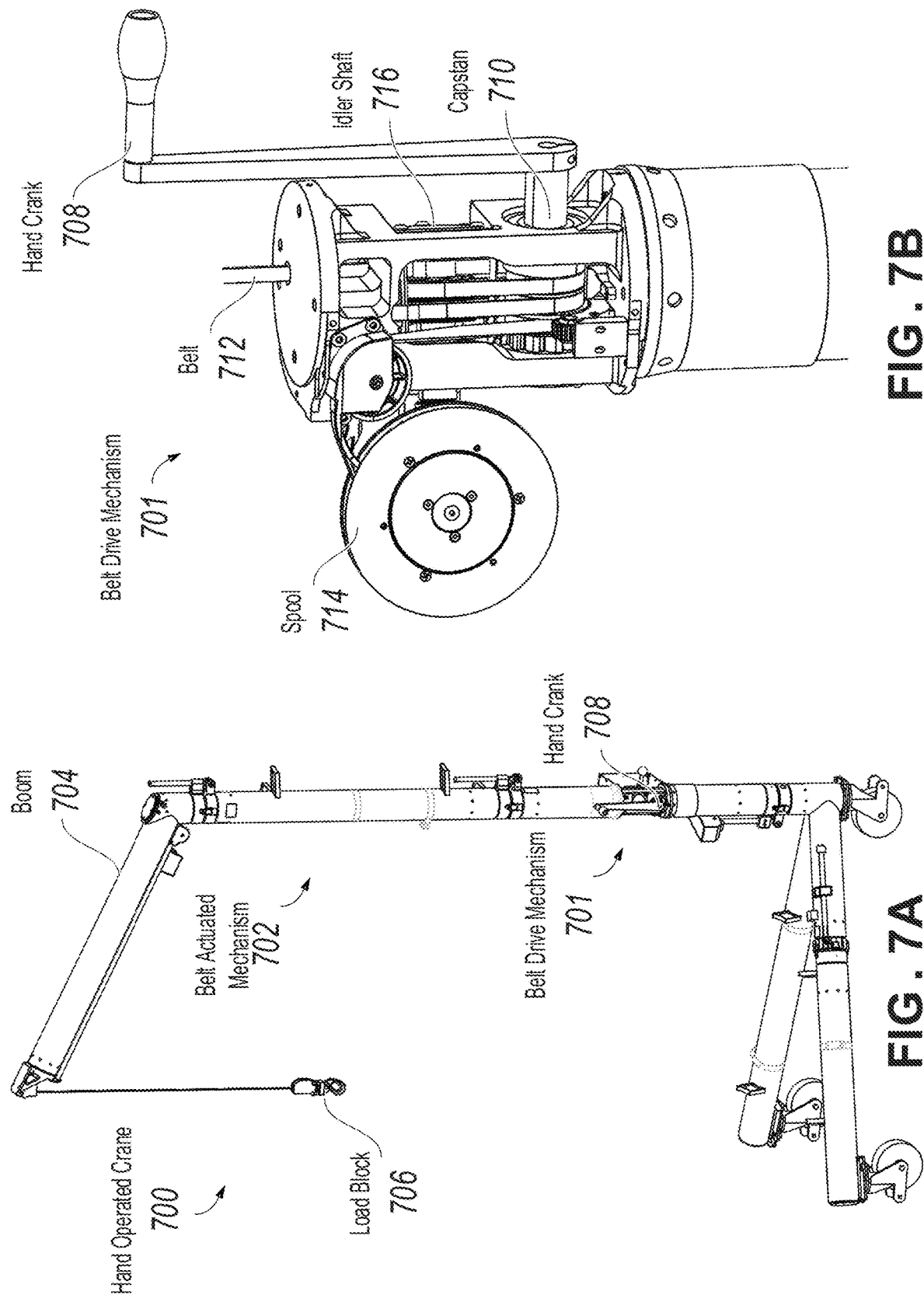

SELF-REELING BELT DRIVE

CROSS-REFERENCE TO RELATED APPLICATIONS

This application claims is a continuation of U.S. Ser. No. 17/335,269, filed Jun. 1, 2021, which claims priority to U.S. Provisional Patent Application No. 63/129,695 filed Dec. 23, 2020, which are incorporated herein in its entirety for all purposes.

TECHNICAL FIELD

This disclosure generally relates to a self-reeling belt drive.

BACKGROUND

Modern belts have many desirable characteristics. They can be lightweight, low-maintenance, and have high strength under tension. Many new and old applications of modern belts are currently being adapted.

SUMMARY

In general, the disclosure involves a self-reeling belt drive mechanism that includes a capstan configured to draw a belt from or pay the belt out to a belt actuated system and an idler shaft coupled to the capstan via the belt. The idler shaft is configured to rotate in a drawing direction when the capstan rotates in a drawing direction and the idler shaft rotates in a payout direction when the capstan rotates in a payout direction. The idler shaft includes a first end configured to accept one or more turns of the belt, a second end coupled to a first one-way locking bearing, and a first gear connected to the first one-way locking bearing. The first one-way locking bearing engages when the idler shaft rotates in the drawing direction, causing the first gear to rotate with the rotating idler shaft. The first one-way locking bearing disengages when the idler shaft rotates in the pay-out direction, permitting relative motion between the first gear and the idler shaft. The belt drive mechanism further includes a spool that receives or pays out a portion of the belt, the spool including an outer hub which is configured to rotate and wind or unwind the portion of the belt around the periphery of the outer hub and a second gear frictionally engaged with the outer hub. The second gear is configured to be driven by the first gear such that the first gear drives the second gear, causing the outer hub to rotate in a direction to wind the portion of the belt when the idler shaft rotates in the drawing direction.

Implementations can optionally include one or more of the following features.

In some implementations, the spool includes an inner hub connected to a central axle via a second one-way locking bearing. The second one-way locking bearing permitting the inner hub to rotate with respect to the central axle when the outer hub is rotated in a direction to wind the portion of the belt. The second one-way locking bearing prevents rotation between the inner hub and the central axle when the outer hub is rotated in a direction to unwind the portion of the belt. The inner hub can be frictionally engaged with the outer hub such that the outer hub overcomes a frictional force between the inner hub and the outer hub to rotate with respect to the inner hub when rotating in a direction to unwind the portion of the belt.

In some implementations, the first gear of the belt drive mechanism is a bevel gear and the second gear is a ring gear.

In some implementations, the second gear is configured to overdrive the outer hub, rotating faster than the outer hub by at least 1.5%.

In some implementations the belt passes through the belt actuated system and returns to the belt drive mechanism such that a first end and a second end of the belt are both within the belt drive mechanism and drawing or paying out of the belt actuates the belt actuated system. In some implementations, the belt actuated system includes a block and tackle system that expands or contracts as the belt is drawn from or payed out to the belt actuated system.

In some implementations, at least one end of the belt is electrically connected to a circuit in the belt drive mechanism. The circuit can measure at least one electrical parameter associated with the belt.

In some implementations, the belt drive mechanism includes an encoder wheel that includes an outer surface with ribs, the ribs engaging with notches in the belt. An axle of the encoder wheel can be connected to an encoder.

This disclosure describes a belt drive mechanism which can be used to pay out to or draw belt from a belt actuated system (or belt driven system). The mechanism features a self-winding spool which can automatically wind or unwind portions of the belt as they are withdrawn from or fed to the belt actuated system. Belt driven systems can have many advantages over other similar systems. For example, a belt driven linear actuator can require less maintenance, be lighter weight, and be capable of more cycles than a similar hydraulic linear actuator. Many belt drive mechanisms include a capstan, which can receive one or more turns or partial turns of a belt and provide rotational force to draw/take in, or pay out, the belt. The capstan can be powered by, for example, an electric motor via a set of reduction gears or a hydraulic motor, among other things. In some implementations, a second rotational axle (e.g., idler shaft) with one or more sheaves (e.g., pulley's or rollers) can be rotationally coupled to the capstan via the belt and can be utilized to drive additional mechanisms in the belt drive mechanism, such as the winding mechanism as described below.

Implementations can include one or more of the following advantages. In certain implementations, the belt drive mechanism includes a frictionally driven spool, which permits varying rotation speed of the spool independently of the belt drive capstan and idler shaft. This ensures tension is maintained throughout operations of the belt drive mechanism, without requiring variable gearing or other complex systems to manage the rotation speeds of various components. A system of one-way locking bearings and frictional surfaces result in a self-reeling mechanism that is mechanically simple, compact, yet robust throughout the range of operations of the belt drive mechanism.

During constant rate winding, as the belt wraps around the spool, the effective diameter of the spool will increase. Similarly, the effective diameter of the spool will decrease during unwinding. Since the diameter is not constant, the rotational speed of the spool can be changed to continue drawing (or paying out) the belt at a constant rate. As described in greater detail below, the spool can be driven by the idler shaft via a frictional interaction, allowing a difference in rotational speed between the spool and the idler shaft. For example, the idler shaft can have a bevel gear or miter gear affixed to one end, which engages a ring gear that is frictionally engaged with a side of the spool. The gearing between the bevel gear and the ring gear can be such that the ring gear will rotate faster than the necessary rotation of the spool as it winds in the belt. The ring gear can be pressed against the side of the spool (e.g., via a spring) and the spinning ring gear can frictionally drive the spool at a slower rate. The slower rate can be limited by tension in the belt. As the spool fills with belt, and its effective diameter increases, it can slow, while still being driven frictionally by the rotating ring gear.

During unwinding, tension provided by the belt can provide the motive force to cause the spool to unwind. If the spool were to rotate freely in the unwinding direction, however, additional problems can occur. For example, as the spool gains angular momentum, it can tend to continue to rotate after the capstan has stopped, potentially introducing slack into the system and causing the capstan to lose traction with the belt. A second mechanism can be provided, which adds rotational friction to the spool that will only be applied when the spool is unwinding, thus preventing slack introduction from a freely rotating spool. In one implementation, the spool can include an outer hub, around which the belt winds, and an inner hub, that is frictionally engaged with the outer hub, such that the outer hub must overcome a predetermined amount of friction to rotate relative to the inner hub. In this implementation, the inner hub can be mounted to an axle via a one-way locking bearing, which allows the inner hub to rotate about the axle in one direction (e.g., when the spool is winding in belt) and prevents movement of the inner hub relative to the axle in a second direction (e.g., when the spool is unwinding). In this manner, during unwinding, the inner hub remains stationary, while the outer hub is rotated about the inner hub via the belt, overcoming friction between the inner hub and outer hub.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

FIGS. 7A and 7B depict a hand operated crane showing an alternate implementation of the belt drive mechanism.

Like reference numbers and designations in the various drawings indicate like elements.

DETAILED DESCRIPTION

Figure 1:
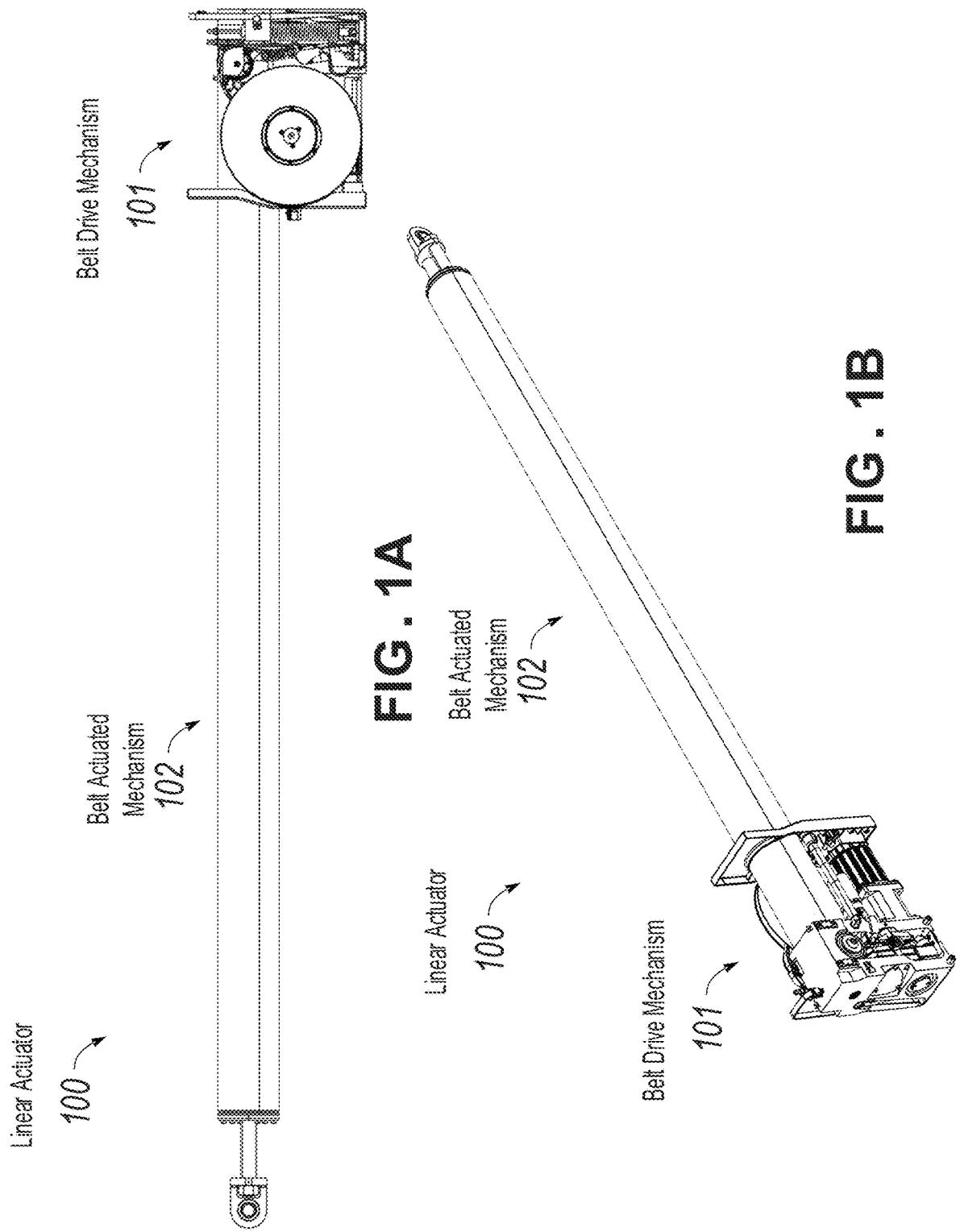
FIG. 1A depicts a side view of a linear actuator that includes a belt drive mechanism and a belt actuated mechanism.
FIG. 1B depicts a perspective view of the linear actuator of FIG. 1A.

This disclosure describes a belt drive mechanism which can be used to pay out to or draw belt from a belt actuated system (or belt driven system). The mechanism features a self-winding spool which can automatically wind or unwind portions of the belt as they are withdrawn from or fed to the belt actuated system. Belt driven systems can have many advantages over other similar systems. For example, a belt driven linear actuator can require less maintenance, be lighter weight, and be capable of more cycles than a similar hydraulic linear actuator. Many belt drive mechanisms include a capstan, which can receive one or more turns or partial turns of a belt and provide rotational force to draw/take in, or pay out, the belt. The capstan can be powered by, for example, an electric motor via a set of reduction gears or a hydraulic motor, among other things. In some implementations, a second rotational axle (e.g., idler shaft) with one or more sheaves (e.g., pulley's or rollers) can be rotationally coupled to the capstan via the belt and can be utilized to drive additional mechanisms in the belt drive mechanism, such as the winding mechanism as described below.

To help a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

FIGS. 1A and 1B depict an example linear actuator 100 including a belt drive system 101 coupled with a belt actuated mechanism 102. As illustrated, the linear actuator with a belt drive mechanism 101 can assume a form factor similar to a standard hydraulic cylinder. In this example, the belt actuated mechanism 102 can include one or more blocks and tackles with multiple free spans of belt between. Drawing belt from the belt actuated mechanism 102 can cause it to contract. Similarly, paying belt out to the belt actuated mechanism 102 can permit it to expand. As illustrated and for simplicity, a single belt drive mechanism 101 is applied and applies motive force in only one direction (e.g., the contracting direction) and depends on gravity or other forces to expand the belt actuated mechanism 102. In some implementations, multiple belt drive mechanisms 101, or different configurations of the belt actuated mechanism 102 can be provided to accommodate two way application of motive force (e.g., the powered expansion and contraction). Additionally, although illustrated as a linear actuator, belt actuated mechanism 102 can be any system configured to use a belt to operate. The present disclosure contemplates many belt actuated mechanisms such as, linear actuators, rotational actuators, cranes, pumps, conveyors, and other belt actuated systems.

Figure 2:
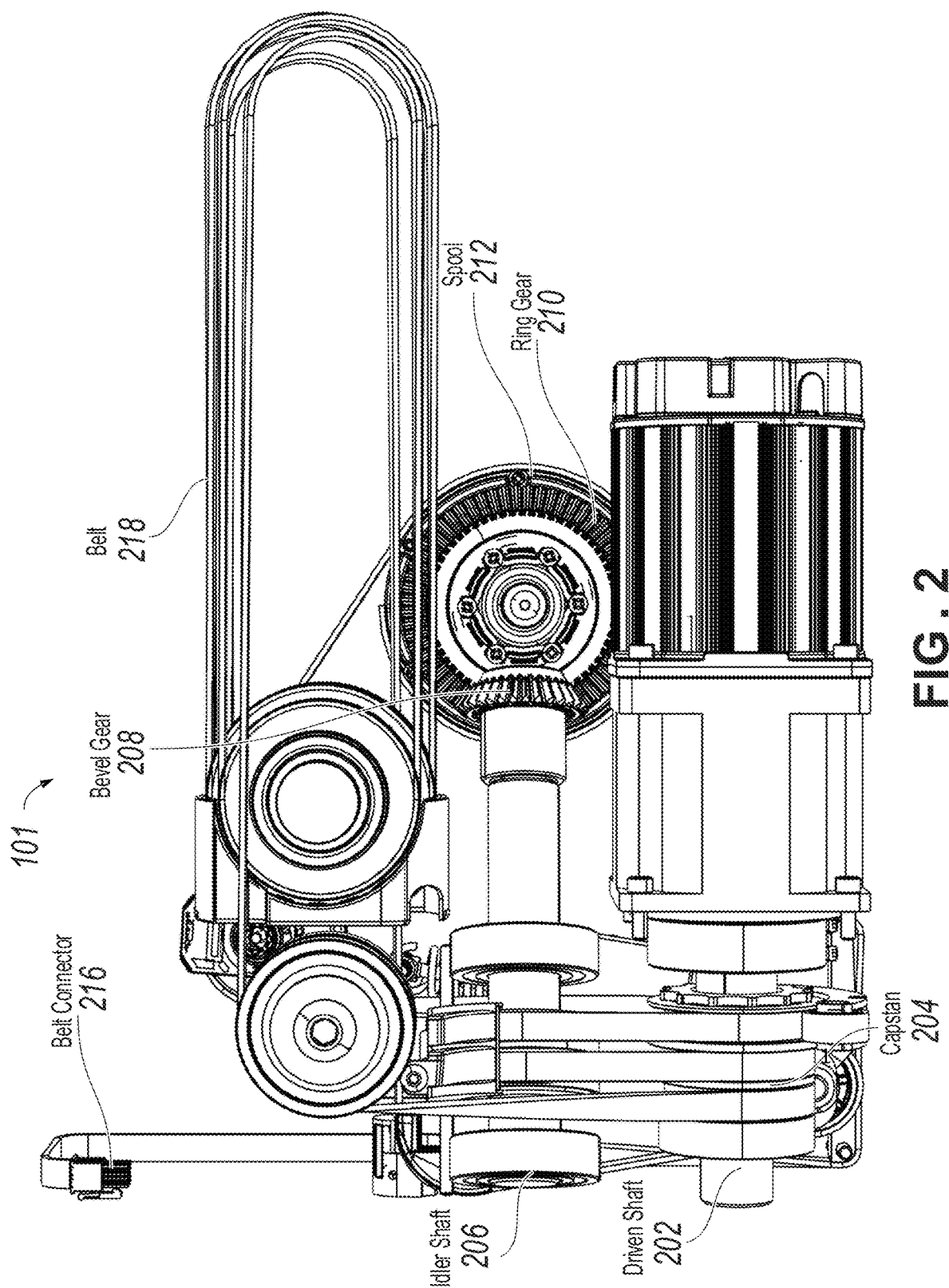
FIG. 2 depicts a right side view of the belt drive mechanism of the linear actuator of FIGS. 1A and 1B.

FIG. 2 depicts a right side view of the belt drive mechanism 101. Some structural and housing components are not shown in FIG. 2 for clarity. A motor and gearbox (e.g., electric motor) or other device can rotate the driven shaft 202, which provides the motive force for operation of the belt drive mechanism 200. A capstan 204 can be configured to accept multiple turns of a belt 218, each turn providing more friction and increasing the amount of tension the capstan 204 can apply to the belt 218. As shown in FIG. 2, the belt 218 completes three half-turns around the capstan 204 with the remaining three half turns passing around an idler shaft 206. A space between the idler shaft 206 and the capstan 204 creates multiple free spans of belt minimizing the twist rate and fleet angles of the belt 218 for reduced wear. The idler shaft 206 which can share turns with the capstan 204 can be supported by one or more bearings, which allow the idler shaft 206 to rotate as the belt 218 passes around it. In this manner, the idler shaft 206 and the driven shaft 202 rotate in generally the same direction, although their axes may not coincide. A bevel gear 208 can be connected on one end of the idler shaft. While illustrated as a bevel gear, any suitable gear (e.g., spur gear, screw gear, worm gear, miter gear etc.) can be used.

The bevel gear 208 engages with a ring gear 210 that is frictionally engaged with a spool 212, such that rotation of the bevel gear 208 causes rotation of the ring gear 210 which imparts a frictional force to rotate the spool 212. As illustrated, the capstan 204 can rotate in a drawing direction, removing belt 218 from the belt actuated mechanism 102, or in a pay-out direction allowing belt 218 to enter the belt actuated mechanism 102. As illustrated in this example, removing belt 218 from the belt actuated mechanism 102 will cause the associated block and tackle to contract, shortening the spans of belt between the blocks in the belt actuated mechanism 102. Paying out belt 218, or allowing belt 218 to enter the belt actuated mechanism 102, can cause the belt actuated mechanism 102 to expand, or the distance of the spans in the belt actuated mechanism 102 can increase.

In some implementations, the bevel gear 208 is connected to the idler shaft 206 via a one-way locking bearing, which permits rotation between the idler shaft 206 and the bevel gear in one direction, but prevents rotation between the idler shaft 206 and the bevel gear in the second direction. For example, when the capstan 204 (and likewise the idler shaft 206) rotates in a drawing direction to take in belt 218 from the belt actuated mechanism 102, the one-way locking bearing in the bevel gear can engage, causing the bevel gear to rotate with the idler shaft. In this manner, the capstan 204 drives the spool via the idler shaft 206, bevel gear 208, and ring gear 210, when the capstan rotates in the drawing direction.

In the illustrated example, the belt 218 passes through the belt actuated mechanism 102 such that both ends of the belt 218 are located in the belt drive mechanism 101. A first end of the belt 218 can be connected with an electrical connector 216, which can be used for monitoring electrical parameters associated with the belt 218 (e.g., continuity, resistance, capacitance, reflectometry of supportive structures within the belt 218, etc.). A second end of the belt 218 can be affixed to the spool 212, which can wind and unwind, taking in portions of the belt 218 as they are drawn from the belt actuated mechanism 102. In some implementations, the belt 218 in the belt driven system can include internal wiring or circuitry or be constructed with electrical properties that change under load. For example, belts frequently have conductive reinforcement structures throughout. In this example, the belt drive system can perform continuity checks, measuring the impedance or resistance between one or more ends of the conductive reinforcement structures and thus determine if they have broken and therefore compromised the structural integrity of the belt 218. In another example, a continuity between the internal conductive material of the belt 218 and the housing of the drive mechanism can be measured. Continuity between the internal conductive material of the belt 218 and the housing can indicate that a portion of the belt 218 is worn or damaged and the belt 218 should be replaced or repaired. In some implementations, the belt 218 includes materials which have varying electrical properties under varying loads. For example, as tension in the belt 218 increases, its resistance or impedance can also increase. An electrical connection at one or both ends of the belt 218 can be provided to permit measurement of one or more electrical properties, which can be used to determine the status of the belt 218 (e.g., tension, temperature, configuration etc.).

Figure 3:
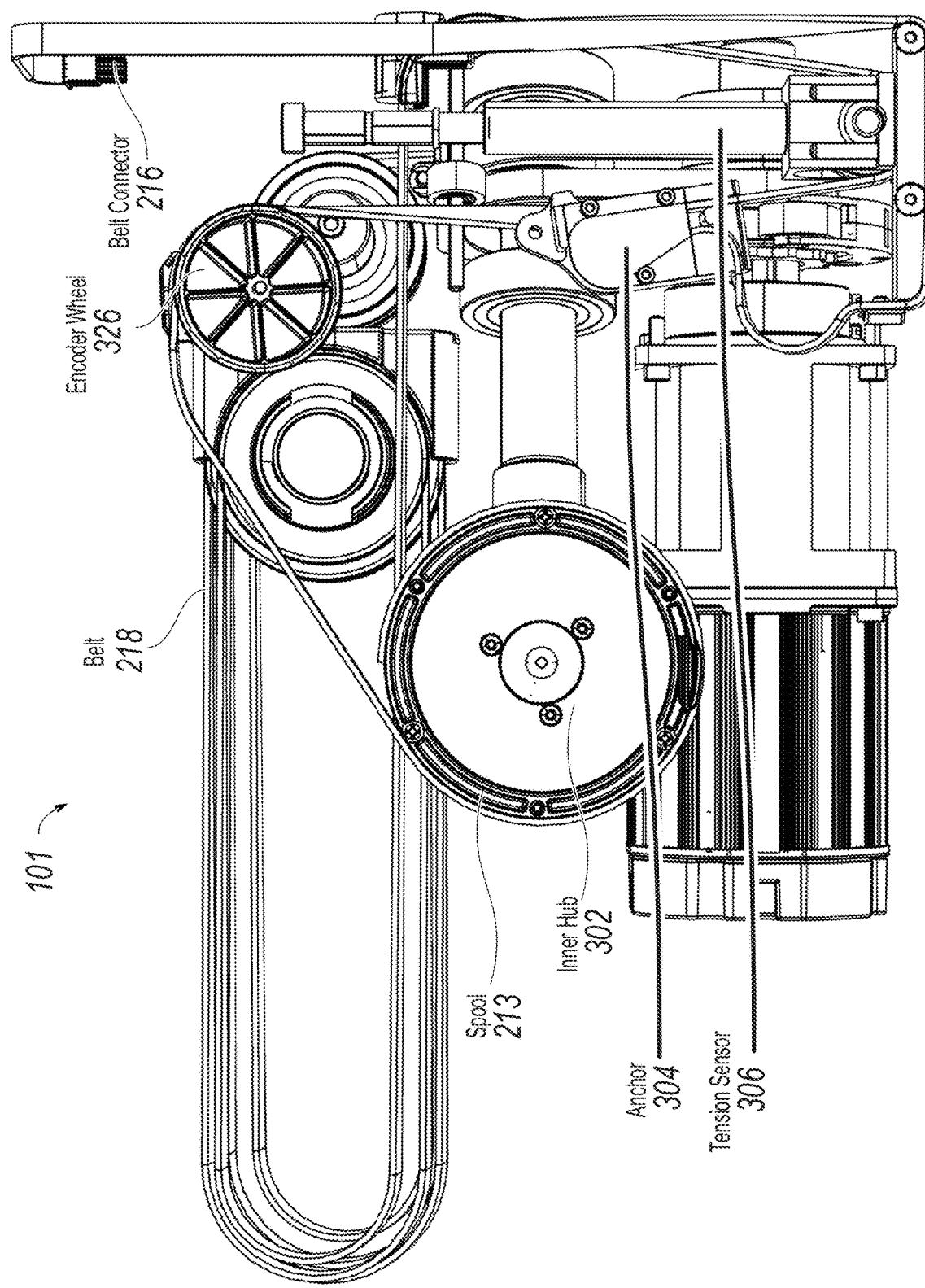
FIG. 3 depicts a left side view of the belt drive mechanism of the linear actuator of FIGS. 1A and 1B.

FIG. 3 depicts a left side view of the belt drive mechanism 101. Various structural components are not illustrated for simplicity. Spool 213 is mounted to an inner hub 302. In some implementations, the inner hub 302 and the spool 213 are frictionally engaged, such that the spool 213 can rotate about the inner hub 302 if a friction force between the inner hub 302 and the spool 213 is overcome. In some implementations, the spool 213 is spring biased into a wear surface of the inner hub 302. The inner hub 302 can be mounted on a fixed axle, via a one-way locking bearing which can be similar to or different from the one-way locking bearing described above with reference to the bevel gear 208. When the spool 213 is rotating in a winding direction, driven by the ring gear 210, the inner hub can rotate with the spool 213, minimizing friction and allowing the spool to wind in belt 218. During pay out operations, when the capstan 204 is rotating in the pay-out direction, the bevel gear 208 spins freely, independent of the idler shaft 206, and permits rotation of the spool 212 in the unwinding direction. If the spool 212 were to accumulate significant angular momentum in the unwinding direction it could continue to pay out belt 218 after the capstan has stopped rotating, therefore introducing slack into the system potentially causing a loss of control or other problem with the belt drive mechanism 101. To ensure the spool 213 stops when the capstan 204 stops, the inner hub 302 and its associated one-way bearing lock to the central axle, preventing rotation of the inner hub 302. During pay-out, the spool rotates 213 around the inner hub 302, the tension in the belt 218 overcoming the friction between the spool 213 and the inner hub 302.

Also illustrated in FIG. 3 is the anchor 304, which affixes one end of the belt 218 to the belt drive mechanism 101. The anchor is located at a high tension end of the belt 218 and provides a fixed reference point for the belt 218 within the belt drive mechanism 101. The belt 218 passes from the anchor 304 over the tension sensor 306, and into the belt actuated mechanism 102. A more detailed description of the belt's path through the belt drive mechanism 101 and the belt actuated mechanism 102 is discussed below with respect to FIG. 4.

Still referring to FIG. 3, in some implementations, the belt drive mechanism 101 includes an encoder wheel 326. The encoder wheel 326 can have bumps or protrusions on its outer surface that are configured to mate with notches or grooves in the belt 218, ensuring the belt 218 does not slide across the encoder wheel 326. The encoder wheel 326 can be mounted to an encoder, which can provide an accurate position indication of the encoder wheel 326, and therefore an accurate position indication of the belt 218. The belt actuated mechanism 102 can have a position that is directly related to the belt position. For example, where the belt actuated mechanism 102 is part of a linear actuator, the distance the actuator has been expanded or contracted can be directly determined from the encoder position.

The tension sensor 306, as shown in FIG. 3, can have a sheave that redirects the belt 218. As the sheave on the tension sensor 306 redirects the belt 218, a reaction force proportional to the tension in the belt 218 is generated on the sheave. The sheave can be affixed to a translating component (e.g., piston or cylinder) which is spring biased against the reaction force. In this configuration, as tension in the belt 218 increases, the reaction force will increase, compressing the spring and translating the sheave (upward in the illustration provided in FIG. 3). A position indicator on the translating component can measure the translation of the sheave and translating component, which is proportional to the tension in the belt 218. The position indicator can be electronic (e.g., one or more Hall Effect sensors, or strain gauges) or mechanical (e.g., painted or engraved position indication). The tension sensor 306 can be used for automatic safety action (e.g., emergency payout) or to calculate expected wear and determine service life of the belt 218 or of the belt drive.

Figure 4:
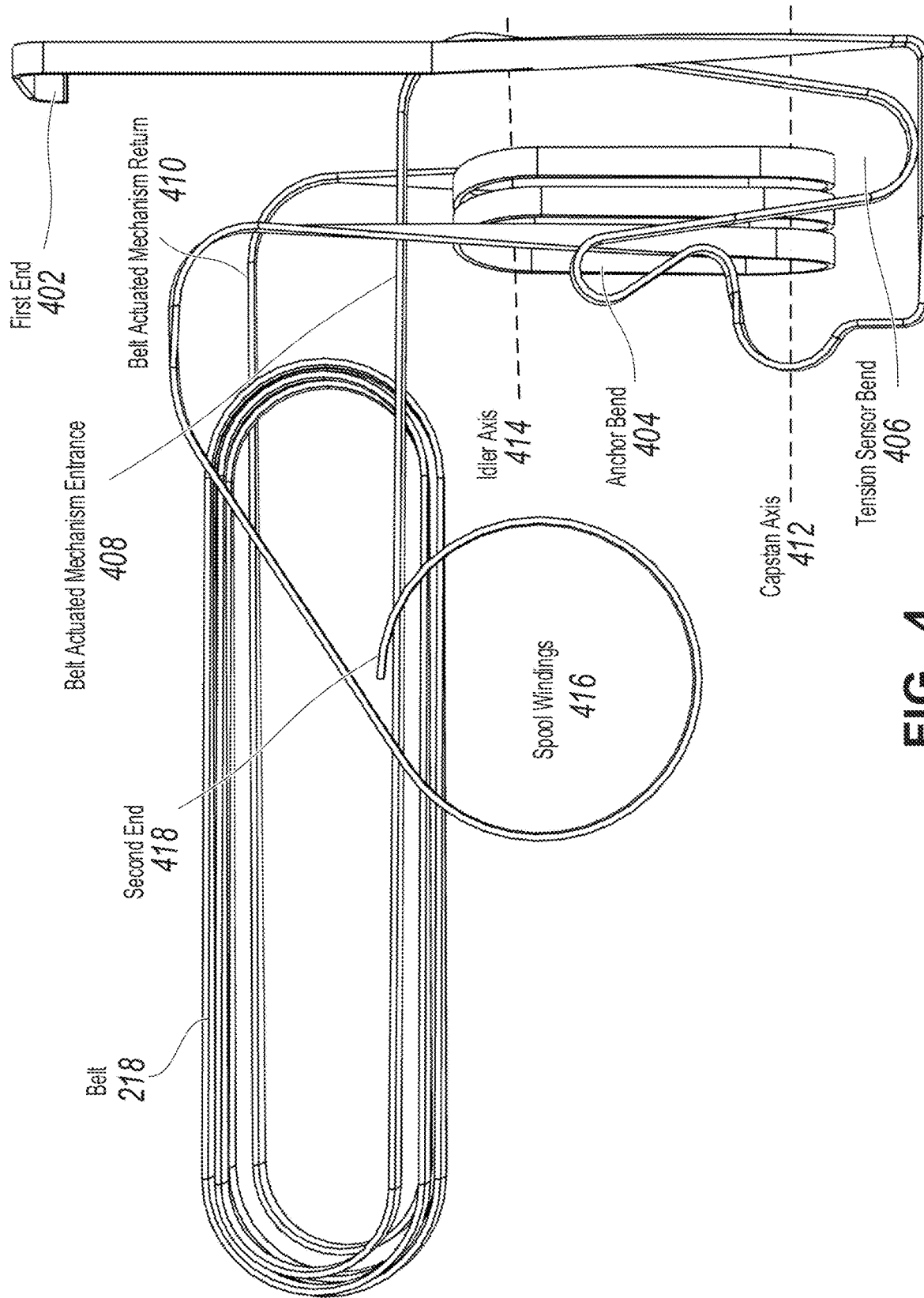
FIG. 4 depicts a belt of the belt drive mechanism of the linear actuator of FIGS. 1A and 1B.

FIG. 4 depicts the belt 218 of the belt drive mechanism 101 and the belt actuated mechanism 102. Referring to FIGS. 2-4, a first end 402 of the belt 218 can be connected to an electrical connector (e.g., belt connector 206 as described with reference to FIG. 2) and mounted to a circuit board or other device within the belt drive mechanism 101. The belt 218 can then pass through an anchor which creates a high friction anchor bend 404, ensuring that the first end 402 of the belt 218 is not under tension, and that the belt 218 is fixed about the anchor bend 404. The belt 218 can then pass over a tension sensor (e.g., tension sensor 306 as described with respect to FIG. 3) creating the tension sensor bend 406.

The belt 218 then enters the belt 218 actuated mechanism at the belt actuated mechanism entrance 408. The illustrated example depicts the belt 218 passing through a block and tackle system with a number of free spans within the belt actuated mechanism. The belt 218 then returns to the belt drive mechanism via the belt actuated mechanism return 410, where it passes around the capstan and the idler shaft causing one or more bends around both the capstan axis 412 and the idler axis 414. Following its final turn around the capstan axis 412 and idler axis 414, the belt 218 passes into the spool windings 416, where it is spooled or unspooled according to the operations of the belt drive mechanism. A second end 418 can terminate the belt 218 and be affixed to the spool.

Figure 5:
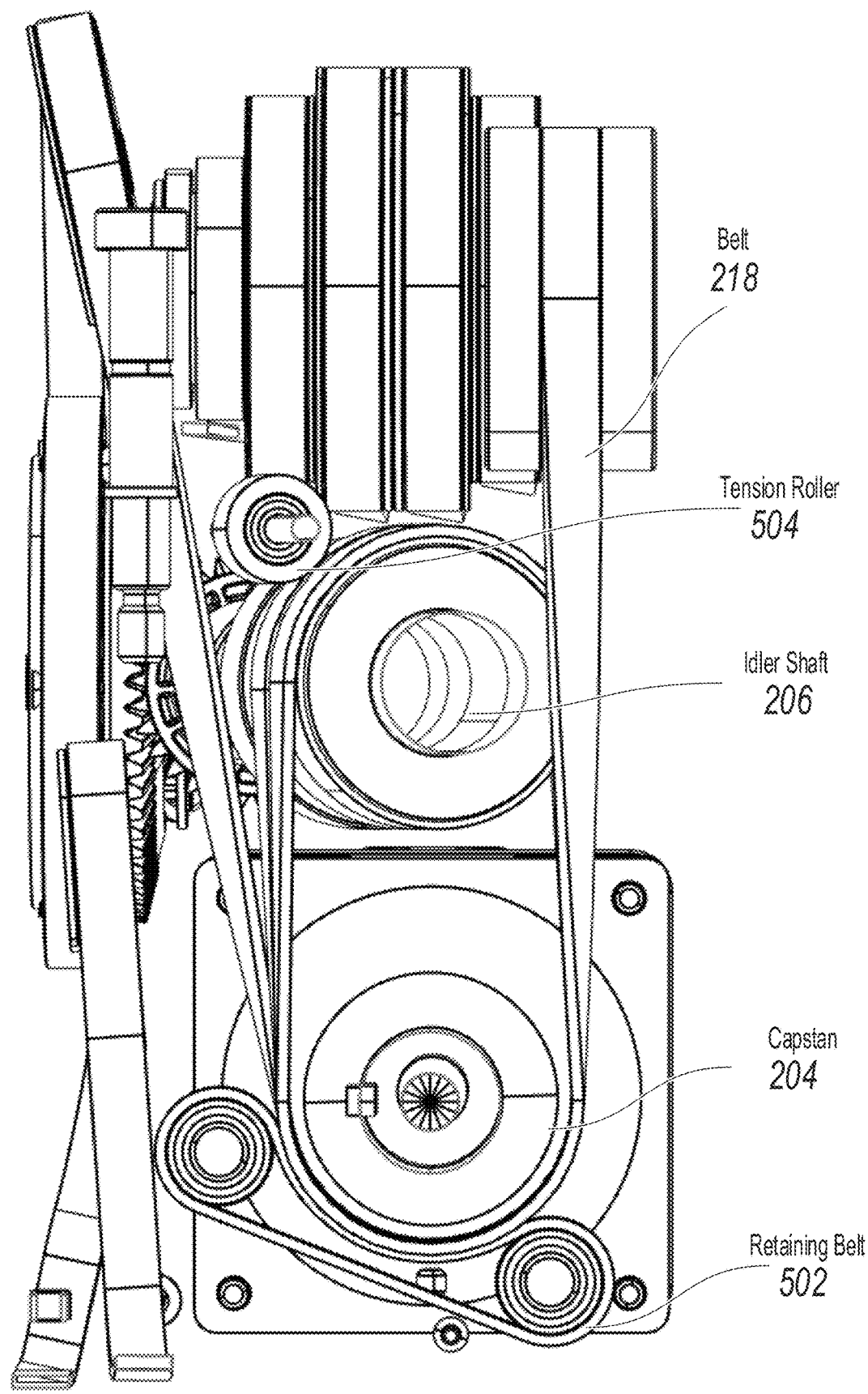
FIG. 5 depicts a cutaway of a retaining belt and tension roller of the belt drive mechanism of the linear actuator of FIGS. 1A and 1B.

FIG. 5 depicts a cutaway of the belt drive mechanism 101 including a retaining belt and tension roller which can be used as a slack removal device. In some belt driven systems, it is desirable to minimize slack in the system. In other words, it is preferable to keep the belt 218, or a portion of the belt 218 under tension at all times. In a system with two shafts, one that is powered and one that is driven by the belt 218 (e.g., a capstan and idler shaft) a system for assuring positive tension in the belt 218 can be provided. A first retaining device, such as a belt or roller can force the belt 218 against a portion of the capstan, ensuring traction between the capstan and the belt 218 regardless of belt tension. A second retaining device can apply pressure to the belt 218 on the idler shaft, and ensure positive contact with the idler shaft. In this way, in the event of slack, the capstan can withdraw slack from between the first retaining device and the second retaining device, and thus ensure the idler gear rotates with the capstan to remove any remaining slack from the system.

A slack main belt 218 in the belt drive mechanism can cause problems to arise during operation. For example, a slack belt 218 can come off one or more sheaves, or fold over itself causing a blockage and jamming the belt drive mechanism. Additionally, a slack or loose belt 218 can reduce the amount of friction or traction between the capstan and the belt 218, causing the capstan to be unable to move the belt 218. In this scenario, the idler shaft may rotate inconsistently with the capstan, as positive friction is not assured.

Still referring to FIG. 5, a retaining belt 502 can be a separate belt from the main belt 218 of the belt drive mechanism and can be under a predetermined tension and positioned to apply force to one or more turns of the main belt 218 on the capstan 204. In some implementations, the retaining belt 502 applies pressure to the lowest tension turn of the main belt 218 on the capstan 204. This pressure ensures positive contact and therefore positive traction between the main belt 218 and the capstan 204, even when the main belt 218 is in a slacked condition. In addition to the retaining belt 502, a tension roller 504 can be positioned to apply pressure to one or more turns of the belt 218 on the idler shaft 206, ensuring positive contact between the belt 218 and the idler shaft at the tension roller 504. In a situation where the main belt 218 is loose or has slack present, it is assured that the capstan 204 can rotate and draw slack out of the span between the capstan 204 and the tension roller 504 because the retaining belt 502 ensures traction for a portion of the capstan 204. Once slack is removed from the span between the capstan 204 and the tension roller 504, the idler shaft 206 will begin to rotate via the main belt 218, and so slack can be withdrawn from the rest of the system.

Figure 6:
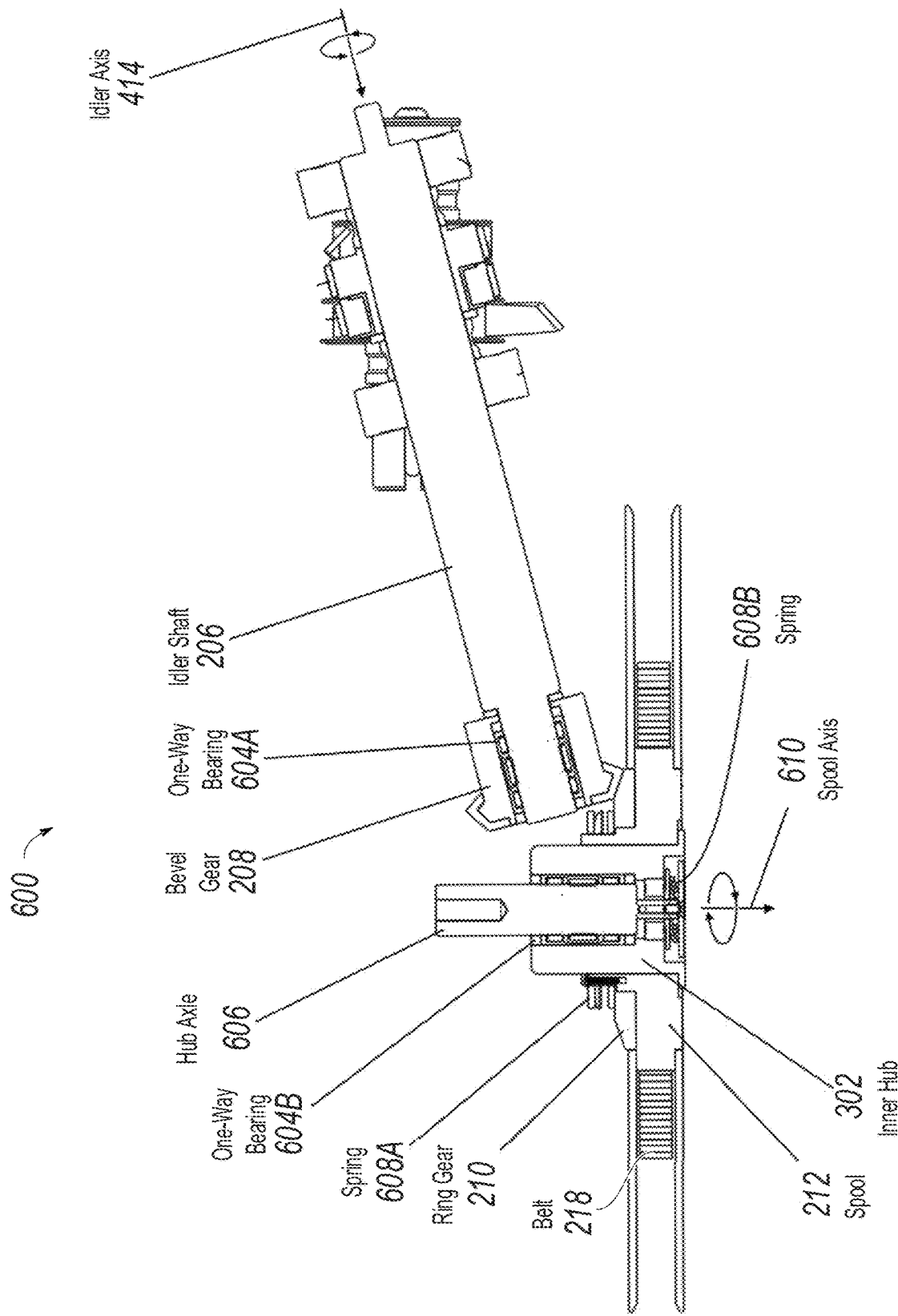
FIG. 6 depicts a cutaway diagram of a self-reeling mechanism of the belt drive mechanism of the linear actuator of FIGS. 1A and 1B.

FIG. 6 depicts a cutaway diagram of a portion of the belt drive mechanism 101 as shown in FIG. 1, including a self-reeling mechanism 600. The idler shaft 206 can rotate about the idler axis 414 in either the drawing direction or the pay-out direction, and is driven by the belt 218 via the capstan. A bevel gear 208 is connected to the idler shaft 206 via one-way bearing 604A. One-way bearing 604A permits rotation between the bevel gear 208 and the idler shaft 206 when the idler shaft rotates in the pay-out direction relative to the bevel gear 208. The one-way bearing 604A prohibits rotation between the idler shaft 206 and the bevel gear 208 in the drawing direction. While illustrated as a bevel gear 208, any suitable gear type or one-way locking mechanism can be used. The bevel gear 208 engages with a ring gear 210, which is in frictional contact with the spool 212. A spring 608A ensures positive engagement between the ring gear 210 and the spool 212. The spool 212 is frictionally engaged with an inner hub 302. The inner hub 302 and the spool 212 can be pressed together by spring 608B. A wear surface (e.g., brake pad, or friction disk) can be provided between the spool 212 and the inner hub 302, which can ensure the desired level of friction between the inner hub 302 and the spool 212 is attained. The inner hub 302 can be mounted to a hub axle 606 via a one-way locking bearing 604B. The one-way locking bearing 604B permits rotation of the inner hub 302 about the hub axle 606 in the winding direction (as indicated by the arrows on spool axis 610) but prohibits rotation of the inner hub 302 about the hub axle 606 in the pay-out direction.

The self-reeling mechanism serves two functions. It ensures that tension is maintained in the belt 218 as the belt 218 is wound around the spool during drawing operations of the belt drive mechanism (e.g., belt drive mechanism 101 as shown and described with reference to FIG. 2). The self-reeling mechanism also maintains tension in the belt 218 during pay-out operations.

During drawing operations, the belt drive mechanism is withdrawing belt 218 from the belt actuated mechanism (e.g., belt actuated mechanism 102 of FIG. 1). The idler shaft 206 rotates about idler axis 414 and engages the one-way locking bearing 604A, which causes the bevel gear 208 to rotate with the idler shaft 206. The drawing direction is as indicated by the arrows on the idler axis 414.

As the bevel gear 208 rotates, it drives the ring gear 210, which applies a twisting force to the spool 212 to cause the spool 212 to rotate about the spool axis 610 in the winding direction. The winding direction is as indicated by the arrows on the spool axis 610. As the spool 212 winds in an increasing amount of belt 218, the effective diameter of the spool 212 increases as belt 218 overlaps. For a constant drawing rate of the belt drive mechanism, the spool 212 must slow. In other words, the rotation rate of the spool 212 must be faster when the spool 212 is empty than when the spool 212 is full. In order to compensate for this variable speed requirement of the spool 212, the ring gear 210 is not directly affixed to the spool 212, but rotates along the side of the spool 212 imparting a frictional force. The gearing between the bevel gear 208 and the ring gear 210 can be selected such that the ring gear will overdrive (e.g., rotate faster than) the spool 212 for the entire range of operation of the spool 212. In some implementations, the ring gear 210 overdrives the spool by 1.5% when the spool 212 is empty, and 15% when the spool 212 is full. The overdriven ring gear 210 ensures spool 212 applies tension to the belt 218 throughout the drawing operations.

During drawing operations, when the spool 212 is rotating in the winding direction, the inner hub 302 rotates freely about the hub axle 606. The spool 212 and the inner hub 302 rotate together.

During pay-out operations, tension must still be maintained in the belt 218. During pay-out the idler shaft 206 rotates in the payout direction (opposite the indicated arrows on the idler axis 414) and one-way bearing 604A disengages, permitting independent rotation of the idler shaft 206 and the bevel gear 208. This permits the idler shaft 206 and the spool 212 to rotate at different speeds as necessary for pay-out of the belt 218 from the spool 212. One-way bearing 604B engages, prohibiting rotation of the inner hub 302 in the unwinding direction (opposite the indicated arrows on the spool axis 610). The tension in the belt 218 pulls the spool 212 around the inner hub 302, overcoming friction between the inner hub 302 and the spool 212. Because the spool must overcome friction to rotate in the pay-out direction, it ensures that tension is maintained in the belt 218 during pay-out operations. In some implementations, the ring gear 210 and the bevel gear 208 rotate with the spool 212, as one way bearing 604A is disengaged.

FIGS. 7A and 7B depict a hand operated crane showing an alternate implementation of the belt drive mechanism. Crane 700 can include a boom 704 and a load block 706 which form a belt actuated mechanism 702. In this implementation, the belt actuated lifting mechanism 702 is a lifting device. A self-reeling belt drive mechanism 701 can be used to operate the crane 700. In this implementation, the belt drive mechanism 701 is hand operated by a hand crank 708. In this implementation, mechanical advantage can be provided to the user based on the diameter of the capstan and hand crank handle as well as, optionally, one or more block and tackle systems housed within the boom 704 (not shown). FIG. 7B illustrates a close up view of the belt drive mechanism 701 with various structural components removed for simplicity. Similar to belt drive mechanism 101, a capstan 710, belt 712, spool 714, and idler shaft 716 are shown.

In some implementations, multiple belt drive mechanisms 101, or different configurations of the belt actuated mechanism 102 can be provided to accommodate two way application of motive force (e.g., the powered expansion and contraction). For example, a pair of block and tackle systems can be coupled together, and configured to operate counter to each other (e.g., one belt pays out while the other is drawn in). Providing both powered expansion and contraction of the linear actuator.

While illustrated as having a rectangular cross section throughout, the belt 218 can be any suitable shape. For example, the belt 218 can have square, triangular, trapezoidal, or any combination thereof of cross sections. In some implementations, one portion of the belt 218 may have a trapezoidal cross section, while another portion can be triangular. The present disclosure is not limiting thereto. Additionally, the belt 218 can be constructed of any suitable material, for example, braided steel, Kevlar, rubber, leather, or a combination thereof.

Although the reeling mechanism has been illustrated with an angled idler shaft and a spool affixed to the side of the belt drive mechanism, in some implementations the spool can be on top of, or below the belt drive mechanism. In some implementations the idler shaft can protrude from the rear of the belt drive mechanism and rotate a spool that is remote from the belt drive mechanism.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A self-reeling belt drive mechanism comprising:
    a capstan configured to draw a belt from a belt actuated system;
    an idler shaft coupled to the capstan via the belt, wherein the idler shaft is configured to rotate in a drawing direction or a pay-out direction, the idler shaft comprising:
        a first end configured to accept one or more turns of the belt;
        a second end coupled to a first one-way locking bearing; and
        a first gear connected to the first one-way locking bearing, wherein the first one-way locking bearing engages when the idler shaft rotates in the drawing direction, causing the first gear to rotate with the rotating idler shaft, and wherein the first one-way locking bearing disengages when the idler shaft rotates in the pay-out direction, permitting relative rotation between the first gear and the idler shaft.

2. The belt drive mechanism of claim 1, comprising a spool configured to receive or pay out a portion of the belt, the spool comprising:
    an outer hub configured to rotate and wind or unwind the portion of the belt around a periphery of the outer hub; and
    a second gear frictionally engaged with the outer hub, wherein the second gear is configured to be driven by the first gear such that the first gear drives the second gear, causing the outer hub to rotate in a direction to wind the portion of the belt when the idler shaft rotates in the drawing direction.

3. The belt drive mechanism of claim 2, wherein the spool comprises an inner hub connected to a central axle via a second one-way locking bearing, wherein the second one-way locking bearing permits the inner hub to rotate with respect to the central axle when the outer hub is rotated in a direction to wind the portion of the belt, wherein the second one-way locking bearing prevents rotation between the inner hub and the central axle when the outer hub is rotated in a direction to unwind the portion of the belt, and wherein the inner hub is frictionally engaged with the outer hub such that the outer hub overcomes a frictional force between the inner hub and the outer hub to rotate with respect to the inner hub when rotating in a direction to unwind the portion of the belt.

4. The belt drive mechanism of claim 2, wherein the first gear is a bevel gear and wherein the second gear is a ring gear.

5. The belt drive mechanism of claim 2, wherein the second gear is configured to overdrive the outer hub, rotating faster than the outer hub by at least 1.5%.

6. The belt drive mechanism of claim 1, wherein the belt passes through the belt actuated system and returns to the belt drive mechanism such that a first end and a second end of the belt are both within the belt drive mechanism; wherein drawing and paying out of the belt actuates the belt actuated system.

7. The belt drive mechanism of claim 6, wherein the belt actuated system comprises a block and tackle that expands or contracts as the belt is drawn from or payed out to the belt actuated system.

8. The belt drive mechanism of claim 6, wherein at least one end of the belt is electrically connected to a circuit in the belt drive mechanism, and wherein the circuit measures at least one electrical parameter associated with the belt.

9. The belt drive mechanism of claim 1, comprising an encoder wheel having an outer surface with ribs, wherein the ribs engage with notches in the belt, and wherein an axle of the encoder wheel is connected to an encoder.

10. A self-reeling belt drive mechanism comprising:
a capstan configured to draw a belt from a belt actuated system;
an idler shaft coupled to the capstan via the belt, wherein the idler shaft is configured to rotate in a drawing direction when the capstan rotates in a direction to draw the belt, and wherein the idler shaft is configured to rotate in a pay-out direction when the capstan rotates in a direction to pay out the belt; and
a spool configured to receive or pay out a portion of the belt, the spool comprising:
an outer hub configured to rotate and wind or unwind the portion of the belt around a periphery of the outer hub; and
an inner hub connected to a central axle via a second one-way locking bearing, wherein the second one-way locking bearing permits the inner hub to rotate with respect to the central axle when the outer hub is rotated in a direction to wind the portion of the belt, wherein the second one-way locking bearing prevents rotation between the inner hub and the central axle when the outer hub is rotated in a direction to unwind the portion of the belt, and wherein the inner hub is frictionally engaged with the outer hub such that the outer hub overcomes a frictional force between the inner hub and the outer hub to rotate with respect to the inner hub when rotating in a direction to unwind the portion of the belt.

11. The belt drive mechanism of claim 10 wherein, the idler shaft comprises:
a first end configured to accept one or more turns of the belt;
a second end coupled to a first one-way locking bearing; and
a first gear connected to the first one-way locking bearing, wherein the first one-way locking bearing engages when the idler shaft rotates in the drawing direction, causing the first gear to rotate with the rotating idler shaft, and wherein the first one-way locking bearing disengages when the idler shaft rotates in the pay-out direction, permitting relative rotation between the first gear and the idler shaft.

12. The belt drive mechanism of claim 11, wherein the spool comprises a second gear frictionally engaged with the outer hub, wherein the second gear is configured to be driven by the first gear such that the first gear drives the second gear, causing the outer hub to rotate in a direction to wind the portion of the belt when the idler shaft rotates in the drawing direction.

13. The belt drive mechanism of claim 12, wherein the first gear is a bevel gear and the second gear is a ring gear.

14. The belt drive mechanism of claim 12, wherein the second gear is configured to overdrive the outer hub, rotating faster than the outer hub by at least 1.5%.

15. The belt drive mechanism of claim 10, wherein the belt passes through the belt actuated system and returns to the belt drive mechanism such that a first end and a second end of the belt are both within the belt drive mechanism; wherein drawing and paying out of the belt actuates the belt actuated system.

16. The belt drive mechanism of claim 10, wherein the belt actuated system comprises a block and tackle that expands or contracts as the belt is drawn from or payed out to the belt actuated system.

17. The belt drive mechanism of claim 10, wherein at least one end of the belt is electrically connected to a circuit in the belt drive mechanism, and wherein the circuit measures at least one electrical parameter associated with the belt.

18. The belt drive mechanism of claim 10, comprising an encoder wheel having an outer surface with ribs, wherein the ribs engage with notches in the belt, and wherein an axle of the encoder wheel is connected to an encoder.

19. A method for actuating a belt actuated system comprising:
actuating a drive mechanism to withdraw belt from the belt actuated system, the drive mechanism comprising:
a capstan configured to draw a belt from a belt actuated system;
an idler shaft coupled to the capstan via the belt, wherein the idler shaft is configured to rotate in a drawing direction or a pay-out direction the idler shaft comprising:
a first end configured to accept one or more turns of the belt;
a second end coupled to a first one-way locking bearing; and
a first gear connected to the first one-way locking bearing, wherein the first one-way locking bearing engages when the idler shaft rotates in the drawing direction, causing the first gear to rotate with the rotating idler shaft, and wherein the one-way locking bearing disengages when the idler shaft rotates in the pay-out direction, permitting relative rotation between the first gear and the idler shaft.

20. The method of claim 19, comprising:
allowing the capstan to rotate and pay out belt to the belt actuated system.

* * * * *